D. S. McAFEE.
TREATING FINE ORES.
APPLICATION FILED AUG. 16, 1918.
1,305,817.
Patented June 3, 1919.
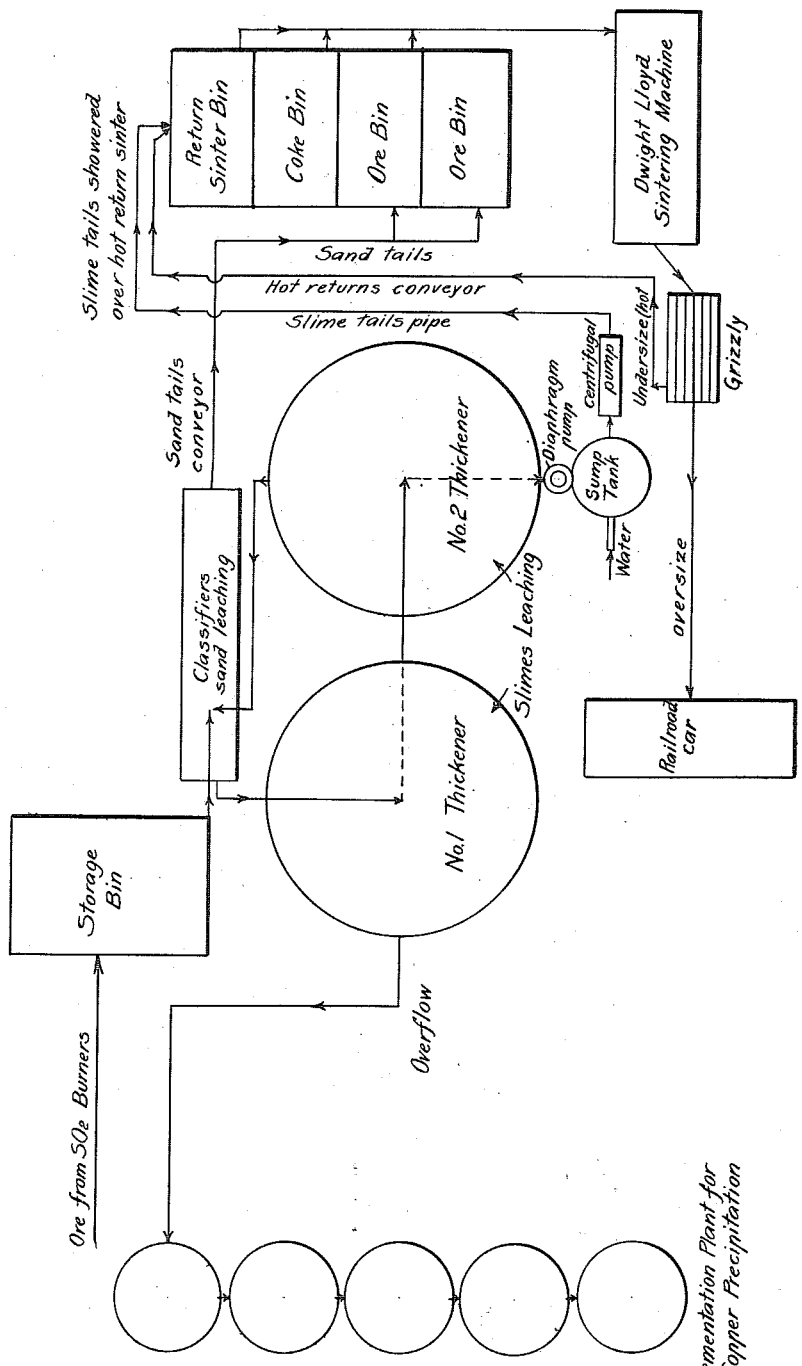
INVENTOR
Daniel S. McAfee
BY
Pennie Davis, Marvin + Edmonds
ATTORNEYS.

UNITED STATES PATENT OFFICE.

DANIEL SHIELDS McAFEE, OF NEW YORK, N. Y., ASSIGNOR TO THE DORR COMPANY, A CORPORATION OF DELAWARE.

TREATING FINE ORES.

1,305,817.  Specification of Letters Patent.  Patented June 3, 1919.

Application filed August 16, 1918. Serial No. 250,126.

*To all whom it may concern:*

Be it known that I, DANIEL S. McAFEE, a citizen of the United States, residing at New York city, in the county of New York, State of New York, have invented certain new and useful Improvements in Treating Fine Ores; and I do hereby declare the following to be a full, clear, and exact description of the invention, such as will enable others skilled in the art to which it appertains to make and use the same.

The present invention relates to the treatment of ore sludges and slimes such as the slimes of ore leaching operations, blast furnace sludges, and the like, encountered in metallurgical operations wherein fine ores are to be sintered. Thus for instance, in the ordinary treatment of iron pyrite the ore is first burned to remove the greater part of the sulfur, after which the ore is leached to remove the copper; the leaching operation being carried out first in a classifier which separates out the sands, and then in settling tanks or thickeners in which the slimes are separated from the leaching liquor, which then passes to a cementation plant where the copper is precipitated. The sands resulting from the leaching operation are commonly conveyed to a sintering plant where the sulfur is almost entirely removed and the iron ore is agglomerated sufficiently to be treated in a blast furnace. The slimes resulting from the thickening operation are commonly of such a character, due to their stickiness and abrasive and corrosive properties that their subsequent treatment is very difficult. The heavy sticky slime, even when mixed with the sand from the classifiers, is very difficult to handle on a belt conveyer, even with the provision of scrapers, brushers or pounders for cleaning the belt. The mixing of the slime with the sand is extremely difficult; the mixture carries so much moisture that there is considerable drip from the conveyer, and on account of the abrasive action of the slime ordinary conveying apparatus is rapidly destroyed. Many expedients have been proposed to overcome these difficulties, but without success. It has also been proposed to filter the slime, but this method is objectionable owing to its high first cost and its heavy up-keep costs, besides requiring a plant of considerable complication.

It is an object of the present invention to provide a method of treating the slime in such a way that it can be handled by simple apparatus advantageously and economically coöperating with the sintering apparatus commonly used in such installations.

In accordance with the preferred practice of the present invention, the slime or sludge is pumped to a bin into which the hot returns from a sintering machine are discharged; first being diluted if it has previously been dewatered to such an extent as to prevent ready pumping thereof. The dilute slime or sludge from the pump is sprayed over the hot returns, where the water is quickly evaporated, and the dry slime or sludge adheres to, or becomes mixed with, the returns which may be then sent through the sintering machine to be agglomerated before being fed to a blast furnace or otherwise utilized.

The details of the invention will appear more clearly from a description of the process and apparatus by which it is carried out. In connection with this description, reference should be made to the accompanying flow sheet in which the apparatus used for treating the various materials, and the course of the materials through the plant is diagrammatically illustrated, and indicated by appropriate legends.

As an example of the practice of the invention, and to enable those skilled in the art to understand it, the invention is hereinafter described as applied to a plant treating iron pyrite.

As the ore comes from the $SO_2$ burners, it carries a small percentage of sulfur, for instance, about two per-cent., and the copper content varies from two and one half per cent. to three-tenths of a per cent. From the storage bin, the ore is conveyed to the classifiers where it is separated into sands and fines. The sands are leached and then conveyed to ore bins for subsequent treatment in a sintering machine which may conveniently be of the Dwight Lloyd type. If fine iron-bearing oxid material is being treated, fuel must be mixed with the ore, because the latter contains no heat furnishing constituent. This fuel may be coke supplied in proper amount from a bin located near the ore bins. The material discharged from the sintering machine while still hot is passed over a grizzly which should preferably have a mesh of about one-half an inch. The over-size may be discharged into cars to be conveyed to the blast furnaces, while the under-size—insufficiently agglomerated for blast furnace use—is partially quenched with water and then dumped into the return sinter bin, to be fed again onto the sintering machine.

The fines from the classifiers are conveyed through thickeners from which the copper solution is drawn off and carried to a cementation plant for obtaining copper precipitation. The slime from the thickener is conveyed by means of a diaphragm pump to a sump tank where it is diluted with water to preferably about 50% moisture. A centrifugal pump conveys the slime from the sump tank to a box set above the return sinter bin and having a perforated bottom, so that the slime falls upon the hot returns as a shower, causing the water to be quickly evaporated and the fine particles of the dried slime to adhere to or be mixed with the relatively coarse returns. From the return sinter bin, the returns with their coatings of dried slime may be conveyed to the sintering machine to be agglomerated for subsequent treatment in the blast furnace. Various mechanical expedients may be adopted for handling conveniently the slime taken from the sump tank, such as the provision of long sweeps in the discharge line from the centrifugal pump, and the provision of a hard lead pump and pipe. In order to avoid, as far as possible, the cutting action of the slime on the gland of the pump, the water supplied to the slime to dilute it may be introduced at the pump gland to protect the packing. A further expedient of adding all fresh water as a spray at the sand end of the last classifier will be found of advantage, as it will remove all slime from the sand and lessen the acid and copper loss at this point.

It will be understood that the above described preferred procedure is to be taken merely as illustrative of the substantial character of the invention and that it may be modified and rearranged in many ways. Thus it will be understood that the slime or sludge may be added to the hot product of or on the sintering machine in many ways and at any desirable point. Particularly it may be desirable, in many cases, to use dilute slime or sludge for quenching the returns at the grizzly.

It will be understood that the invention is not limited to the treatment of slime resulting from the leaching of iron pyrite as has been described above, but is also adapted for use with slime and sludge resulting from or encountered in other metallurgical operations involving the sintering of fine ores; and also that the invention may be practised with other forms of apparatus than those indicated diagrammatically on the flow sheet.

I claim:

1. The herein described process of treating slimes or sludges encountered in metallurgical operations wherein fine ores are to be sintered which consists in adding the slimes to the hot product of a sintering machine to simultaneously dry the slimes and quench the said product.

2. The herein described process of treating slimes or sludges encountered in metallurgical operations wherein fine ores are to be sintered which consists in adding the slimes to the hot returns of a sintering machine to simultaneously dry the slimes and quench the returns.

3. The herein described process of treating slimes or sludges encountered in metallurgical operations wherein fine ores are to be sintered which consists in adding the slimes to the hot returns of a sintering machine and then passing the returns coated with slime through the sintering machine to agglomerate them.

4. The herein described process of treating slimes or sludges encountered in metallurgical operations wherein fine ores are to be sintered which consists in diluting the slimes, and conveying the dilute slimes through a pump line 2 and spreading them upon the hot product of a sintering machine to simultaneously dry the slimes and quench the said product.

5. The herein described process of treating fine ores which consists in separating the ores into sands and slimes, treating the sands in a sintering machine to agglomerate them, and adding the slimes to the hot product of the sintering machine to simultaneously dry the slimes and quench the said product.

6. The herein described process of treating fine ores which consists in separating the ores into sands and slimes, treating the sands in a sintering machine to agglomerate them, adding the slimes to the hot returns from the sintering machine and treating the mixed returns and slimes in the sintering machine to agglomerate them.

7. The herein described process of treating fine ores which consists in separating the ores into sands and slimes, diluting the slimes, treating the sands in a sintering machine to agglomerate them, and conveying the dilute slimes through a pipe line 2 and spreading them upon the hot product of a sintering machine to simultaneously dry the slimes and quench the said product.

8. The herein described process of treating fine ores which consists in separating the ores into sands and slimes, diluting the slimes, treating the sands in a sintering machine to agglomerate them, conveying the dilute slimes through a pipe line 2 and spreading them upon the hot returns of a sintering machine to simultaneously dry the slimes and quench the said returns, and treating the mixed returns and slimes in the sintering machine to agglomerate them.

In testimony whereof I affix my signature.

DANIEL SHIELDS McAFEE.